US00RE39176E

(19) United States
(12) Reissued Patent
Dutt

(10) Patent Number: US RE39,176 E
(45) Date of Reissued Patent: Jul. 11, 2006

(54) RESIN-IMPREGNATED BELT FOR APPLICATION ON PAPERMAKING MACHINES AND IN SIMILAR INDUSTRIAL APPLICATION

(75) Inventor: William H. Dutt, Wolfeboro, NH (US)

(73) Assignee: Albany International Corp., Albany, NY (US)

(21) Appl. No.: 10/342,983

(22) Filed: Jan. 15, 2003

Related U.S. Patent Documents

Reissue of:
(64) Patent No.: 6,174,825
Issued: Jan. 16, 2001
Appl. No.: 08/987,827
Filed: Dec. 9, 1997

(51) Int. Cl.
*D21F 3/02* (2006.01)

(52) U.S. Cl. ..... 442/43; 442/3; 442/50; 442/58; 442/187; 442/203; 442/220; 442/307; 442/314; 442/333; 442/366; 162/358.4; 162/901

(58) Field of Classification Search ..... 442/1–3, 442/37, 43, 46, 50, 58, 181, 187, 203, 218, 442/220, 304, 307, 312–314, 327, 330, 333, 442/366; 162/358.4, 901; 428/113, 114, 423.1
See application file for complete search history.

(56) References Cited

U.S. PATENT DOCUMENTS

| | | | | | |
|---|---|---|---|---|---|
| 4,552,620 | A | | 11/1985 | Adams | |
| 4,908,103 | A | * | 3/1990 | Cronin et al. | 162/358 |
| 4,923,570 | A | | 5/1990 | Steiner et al. | |
| 5,118,391 | A | * | 6/1992 | Matuschczyk et al. | 162/358 |
| 5,132,141 | A | | 7/1992 | Schon | |
| 5,134,010 | A | | 7/1992 | Schiel | |
| 5,196,092 | A | * | 3/1993 | Stigberg | 162/358.4 |
| 5,238,537 | A | * | 8/1993 | Dutt | 162/358.4 |
| 5,277,728 | A | | 1/1994 | Stigberg | |
| 5,320,702 | A | | 6/1994 | Matuschczyk et al. | |
| 5,626,723 | A | * | 5/1997 | Schiel et al. | 162/358.4 |
| 5,833,898 | A | * | 11/1998 | Dutt | 264/102 |
| 6,171,447 | B1 | | 1/2001 | Trokhan | |

FOREIGN PATENT DOCUMENTS

| | | |
|---|---|---|
| EP | 0 354 743 B1 | 2/1990 |
| EP | 0 534 041 B1 | 3/1993 |
| WO | WO 88/08897 | 11/1988 |
| WO | WO 95/29293 | 11/1995 |

OTHER PUBLICATIONS

"Fundamentals of Composites Manufacturing Materials, Methods, and Applications," by A.B. Strong, Society of Manufacturing Engineers, Michigan; pp. 66–78, 1989.*
Fundamentals of Composites Manufacturing: Materials, Methods, and Applications, Society of Manufacturing Engineers, 1989, pp. 66–78.

* cited by examiner

*Primary Examiner*—Cheryl A. Juska
(74) *Attorney, Agent, or Firm*—Frommer Lawrence & Haug LLP; Ronald R. Santucci

(57) ABSTRACT

A resin-impregnated endless belt for a long nip press or calender of the shoe type, or for other papermaking and paper-processing applications, has a base fabric in the form of an endless loop with an inner surface, an outer surface, a machine direction and a cross-machine direction. The base fabric has machine-direction (MD) structural elements and cross-machine-direction (CD) structural elements in an open structure wherein at least some of the MD structural elements and CD structural elements are spaced apart from one another. The MD structural elements cross the CD structural elements at a plurality of crossing points, where they are joined to one another by mechanical, chemical or thermo-bonding means. A coating of a first polymeric resin is on the inner surface of the base fabric. The first polymeric resin impregnates and renders the base fabric impermeable to liquids, and forms a layer on the inner surface thereof. The coating is smooth and provides the belt with a uniform thickness. A method for manufacturing the belt, using a smooth and polished cylindrical mandrel with a spacer ring slidably disposed thereon, is also shown.

41 Claims, 13 Drawing Sheets

12
20
20
10
18
14
18
16

RESIN-IMPREGNATED BELT FOR APPLICATION ON PAPERMAKING MACHINES AND IN SIMILAR INDUSTRIAL APPLICATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to mechanisms for extracting water from a web of material, and, more particularly, from a fibrous web being processed into a paper product on a papermaking machine. Specifically, the present invention is a method for manufacturing resin-impregnated endless belt structures designed for use on a long nip press of the shoe type on a papermaking machine, and for other papermaking and paper-processing applications, and the belt structures manufactured in accordance with the method.

2. Description of the Prior Art

During the papermaking process, a fibrous web of cellulosic fibers is formed on a forming wire by depositing a fibrous slurry thereon in the forming section of a papermachine. A large amount of water is drained from the slurry in the forming section, after which the newly formed web is conducted to a press section. The press section includes a series of press nips, in which the fibrous web is subjected to compressive forces applied to remove water therefrom. The web finally is conducted to a drying section which includes heated dryer drums around which the web is directed. The heated dryer drums reduce the water content of the web to a desirable level through evaporation to yield a paper product.

Rising energy costs have made it increasingly desirable to remove as much water as possible from the web prior to its entering the dryer section. As the dryer drums are often heated from within by steam, costs associated with steam production can be substantial, especially when a large amount of water needs to be removed from the web.

Traditionally, press sections have included a series of nips formed by pairs of adjacent cylindrical press rolls. In recent years, the use of long press nips of the shoe type has been found to be more advantageous than the use of nips formed by pairs of adjacent press rolls. This is because the longer the time a web can be subjected to pressure in the nip, the more water can be removed there, and, consequently, the less water will remain behind in the web for removal through evaporation in the dryer section.

The present invention relates to long nip presses of the shoe type. In this variety of long nip press, the nip is formed between a cylindrical press roll and an arcuate pressure shoe. The latter has a cylindrically concave surface having a radius of curvature close to that of the cylindrical press roll. When the roll and shoe are brought into close physical proximity to one another, a nip which can be five to ten times longer in the machine direction than one formed between two press rolls is formed. Since the long nip is five to ten times longer than that in a conventional two-roll press, the so-called dwell time of the fibrous web in the long nip is correspondingly longer under the same level of pressure per square inch in pressing force used in a two-roll press. The result of this new long nip technology has been a dramatic increase in dewatering of the fibrous web in the long nip when compared to conventional nips on paper machines.

A long nip press of the shoe type requires a special belt, such as that shown in U.S. Pat. No. 5,238,537. This belt is designed to protect the press fabric supporting, carrying and dewatering the fibrous web from the accelerated wear that would result from direct, sliding contact over the stationary pressure shoe. Such a belt must be provided with a smooth, impervious surface that rides, or slides, over the stationary shoe on a lubricating film of oil. The belt moves through the nip at roughly the same speed as the press fabric, thereby subjecting the press fabric to minimal amounts of rubbing against the surface of the belt.

Belts of the variety shown in U.S. Pat. No. 5,238,537 are made by impregnating a woven base fabric, which takes the form of an endless loop, with a synthetic polymeric resin. Preferably, the resin forms a coating of some predetermined thickness on at least the inner surface of the belt, so that the yarns from which the base fabric is woven may be protected from direct contact with the arcuate pressure shoe component of the long nip press. It is specifically this coating which must have a smooth, impervious surface to slide readily over the lubricated shoe and to prevent any of the lubricating oil from penetrating the structure of the belt to contaminate the press fabric, or fabrics, and fibrous web.

The base fabric of the belt shown in U.S. Pat. No. 5,238,537 may be woven from monofilament yarns in a single- or multi-layer weave, and is woven so as to be sufficiently open to allow the impregnating material to totally impregnate the weave. This eliminates the possibility of any voids forming in the final belt. Such voids may allow the lubrication used between the belt and shoe to pass through the belt and contaminate the press fabric or fabrics and fibrous web. The base fabric may be flat-woven, and subsequently seamed into endless form, or woven endless in tubular form.

When the impregnating material is cured to a solid condition, it is primarily bound to the base fabric by a mechanical interlock, wherein the cured impregnating material surrounds the yarns of the base fabric. In addition, there may be some chemical bonding or adhesion between the cured impregnating material and the material of the yarns of the base fabric.

Long nip press belts, such as that shown in U.S. Pat. No. 5,238,537, depending on the size requirements of the long nip presses on which they are installed, have lengths from roughly 13 to 35 feet (approximately 4 to 11 meters), measured longitudinally around their endless-loop forms, and widths from roughly 100 to 450 inches (approximately 250 to 1125 centimeters), measured transversely across those forms.

It will be recognized that the length dimensions of the long nip press belts given above include those for belts for both open- and closed-loop presses. Long nip press belts for open-loop presses generally have lengths in the range from 25 to 35 feet (approximately 7.6 to 11 meters). The lengths (circumferences) of long nip press belts for some of the current closed-loop presses are set forth in the following table:

| Manufacturer | Type | Belt Diameter (mm) | Length (mm) (Circumf.) |
|---|---|---|---|
| Valmet | Symbelt Press | 1425 | 4477 |
| | Symbelt Press | 1795 | 5639 |
| | Symbelt Press | 1995 | 6268 |
| Voith | Flex-O-Nip | 1270 | 3990 |
| | Flex-O-Nip | 1500 | 4712 |
| | Nip-Co-Flex | 1270 | 3990 |

-continued

| Manufacturer | Type | Belt Diameter (mm) | Length (mm) (Circumf.) |
|---|---|---|---|
| | Nip-Co-Flex | 1500 | 4712 |
| | Intessa-S | 1270 | 3990 |
| | Intessa-S | 1550 | 4869 |
| Beloit | ENP-C | 1511 (59.5 inch) | 4748 |
| | ENP-C | 2032 (80 inch) | 6834 |

It will be appreciated that the manufacture of such belts is complicated by the requirement that the base fabric be endless prior to its impregnation with a synthetic polymeric resin.

Nevertheless, belts of this variety have been successfully manufactured for some years. However, two lingering problems remain in the manufacturing process.

Firstly, it remains difficult to remove all of the air from the base fabric during the impregnation and coating process. As implied above, air remaining in the woven structure of the base fabric manifests itself as voids in the final belt product. Such voids may allow the lubrication used between the belt and the arcuate pressure shoe to pass through the belt and contaminate the press fabric or fabrics and fibrous web. As a consequence, it is important to get all air out of the base fabric to achieve its complete impregnation by the synthetic polymeric resin being used.

Secondly, it remains difficult to provide the inner surface of the belt with a layer of synthetic polymeric resin without inverting the belt (turning it inside out) at some point during the manufacturing process. It will be appreciated that belts of the dimensions given above are not readily turned inside out, and that the act of doing so places a great strain on the impregnating and coating material, often leaving weak spots which may develop into full-fledged holes through the belt. Accordingly, the widely used technique of providing a layer of polymeric resin material on the outside of the belt, and inverting of the belt to place the layer on the inside, has not yielded consistently satisfactory results.

The present invention provides a solution to these problems, which characterize prior-art methods for manufacturing resin-impregnated endless belt structures, by including the use of an endless base fabric having a more open structure than those of the prior art to decrease the likelihood that air will be trapped therewithin, and by providing a layer of the polymeric resin material on the inner surface of the belt without having to turn the belt inside out at any time during the manufacturing process.

SUMMARY OF THE INVENTION

Accordingly, the object of the present invention is to provide a method for manufacturing a resin-impregnated endless belt, and the resulting belt product, for use in the papermaking process or in other industrial applications where an endless belt, impermeable to water, oil and other fluids, and having at least one smooth uniform side, a uniform thickness, abrasion resistance and required hardness characteristics, is desirable.

One such application is as a belt used on long nip presses of the shoe type on paper machines. For this application, the belt needs to be smooth and impervious to oil on the side that rides on the lubricating oil film on the shoe, which forms one side of the nip. The side away from the shoe can be smooth or can be provided with void volume, in the form of grooves or blind-drilled holes, into which water expressed from a paper web in the nip can pass.

A second such application is as a belt used for the calendering of paper either in a roll nip or in a long shoe-type nip. Such a belt is required to be smooth on both sides, impermeable to oil (when used in a calender having a long shoe-type nip), of uniform thickness, and having the hardnesses required for each side.

In its broadest form, the present resin-impregnated endless belt comprises a base fabric in the form of an endless loop with an inner surface, an outer surface, a machine direction and a cross-machine direction. The base fabric has machine-direction (MD) structural elements and cross-machine-direction (CD) structural elements, wherein at least some of the MD structural elements are spaced apart from one another by a distance in the range from 0.0625 inch to 0.5 inch (0.16 cm to 1.27 cm), and wherein at least some of the CD structural elements are spaced apart from one another by a distance in the range from 0.0625 inch to 0.5 inch (0.16 cm to 1.27 cm). The MD structural elements cross or are interwoven with the CD structural elements at a plurality of crossing points, where the MD structural elements and the CD structural elements are joined to one another. The joining may be by mechanical, chemical or thermobonding means.

The belt further comprises a coating of a first polymeric resin on the inner surface of the base fabric. The coating impregnates and renders the base fabric impermeable to liquids, and forms a layer on the inner surface thereof. The coating is smooth and provides the belt with a uniform thickness. The resin impregnate fills the space on the inside of the fabric, the voids in the fabric structure, and provides a final layer of resin on the outside of the fabric structure.

The method for manufacturing the present resin-impregnated endless belt requires the use of a smooth, polished cylindrical mandrel, which is rotatable about its longitudinal axis. The mandrel is disposed so that its longitudinal axis is oriented in a horizontal direction.

A spacer ring having an inside diameter equal to the diameter of the cylindrical mandrel is disposed on and is slidable along the cylindrical mandrel. The spacer ring has a thickness, measured radially, equal to that desired for the layer of polymeric resin to be formed on the inside surface of the base fabric.

The spacer ring, it follows, has an outside diameter equal to that of the base fabric described above which is placed in sleeve-like fashion over the mandrel and spacer ring. The base fabric is then placed under tension in the longitudinal direction of the cylindrical mandrel by suitable means.

The spacer ring is then moved to one end of the base fabric on the cylindrical mandrel, and the mandrel is rotated about its horizontally oriented longitudinal axis. Starting next to the spacer ring, a first polymeric resin is dispensed onto and through the base fabric in the form of a stream from a dispenser.

The spacer ring and dispenser are moved longitudinally along the rotating cylindrical mandrel, the spacer ring moving ahead of the dispenser, at a constant rate, so that the first polymeric resin will be applied onto the base fabric in the form of a spiral of preselected thickness. The spacer ring ensures that a layer of desired thickness is provided on the inside surface of the base fabric, while the base fabric is so impregnated.

The first polymeric resin cures by crosslinking as the coating process proceeds across the base fabric. After completion of the resin application, the outer surface of the belt may be finished to a smooth surface or to a surface containing void volume.

The present method may be used to manufacture resin-impregnated belt structures for use in all phases of the papermaking industry. That is to say, that endless belt structures may be used as roll covers, and calender belts, as well as on long nip presses of the shoe type.

The several embodiments of the present invention will now be described in more complete detail. In the description, frequent reference will be made to the drawing figures identified immediately below.

DETAILED DESCRIPTION OF THE PREFERRED EMBODIMENTS

Figure 1:
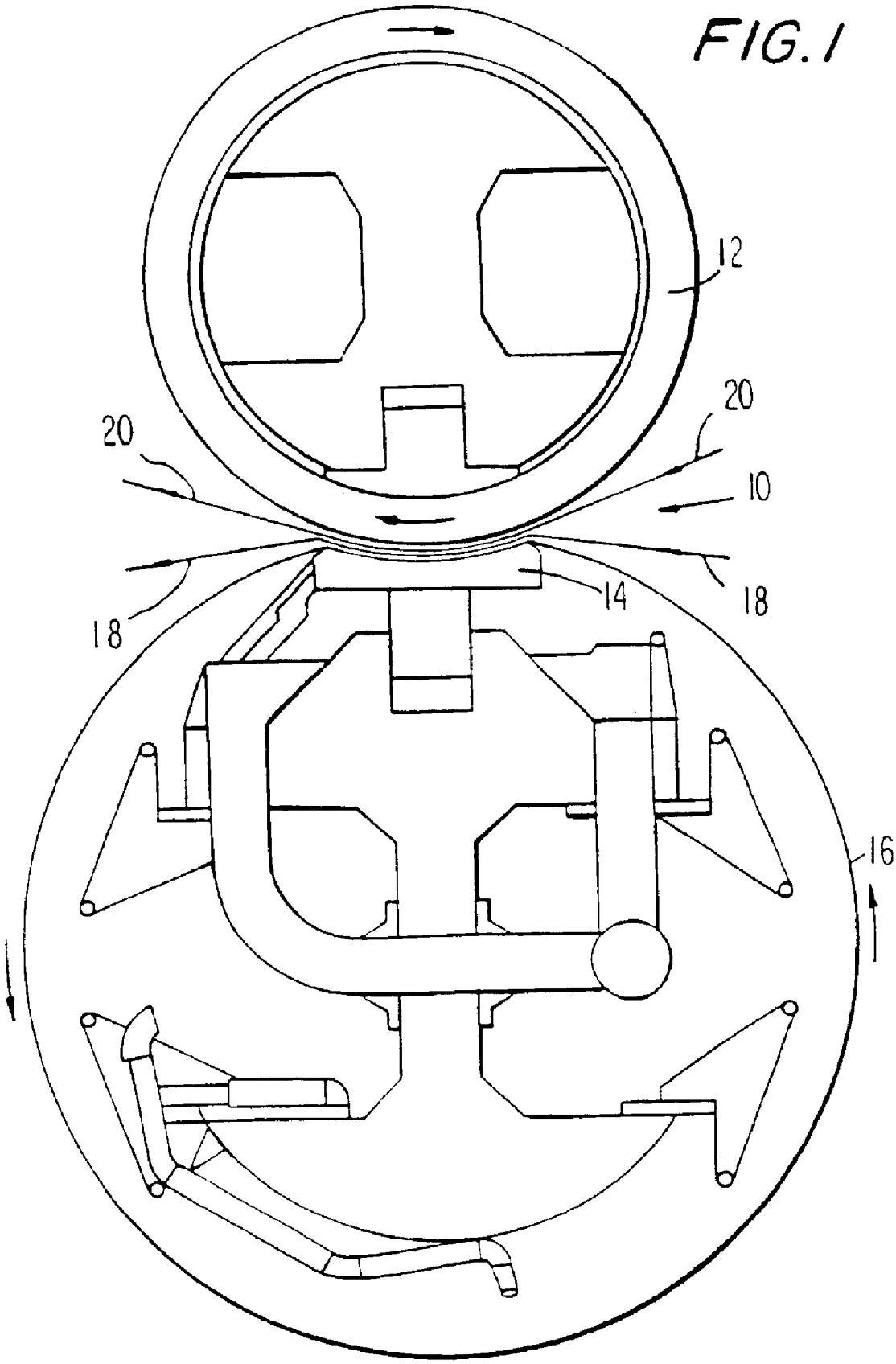
FIG. 1 is a side cross-sectional view of a long nip press.

A long nip press for dewatering a fibrous web being processed into a paper product on a paper machine is shown in a side cross-sectional view in FIG. 1. The press nip 10 is defined by a smooth cylindrical press roll 12 and an arcuate pressure shoe 14. The arcuate pressure shoe 14 has about the same radius of curvature as the cylindrical press roll 12. The distance between the cylindrical press roll 12 and the arcuate pressure shoe 14 may be adjusted by hydraulic means operatively attached to arcuate pressure shoe 14 to control the loading of the nip 10. Smooth cylindrical press roll 12 may be a controlled crown roll matched to the arcuate pressure shoe 14 to obtain a level cross-machine nip profile.

Endless belt structure 16 extends in a closed loop through nip 10, separating press roll 12 from arcuate pressure shoe 14. A wet press fabric 18 and a fibrous web 20 being processed into a paper sheet pass together through nip 10 as indicated by the arrows in FIG. 1. Fibrous web 20 is supported by wet press fabric 18 and comes into direct contact with smooth cylindrical press roll 12 in nip 10. Fibrous web 20 and wet press fabric 18 proceed through the nip 10 as indicated by the arrows.

Alternatively, fibrous web 20 may proceed through the nip 10 between two wet press fabrics 18. In such a situation, the press roll 12 may be either smooth or provided with void-volume means, such as grooves or blind-drilled holes. Similarly, the side of endless belt structure 16 facing the wet press fabrics 18 may also be smooth or provided with void-volume means.

In any event, endless belt structure 16, also moving through press nip 10 as indicated by the arrows, that is, counter-clockwise as depicted in FIG. 1, protects wet press fabric 18 from direct sliding contact against arcuate pressure shoe 14, and slides thereover on a lubricating film of oil. Endless belt structure 16, accordingly, must be impermeable to oil, so that wet press fabric 18 and fibrous web 20 will not be contaminated thereby.

Figure 2:
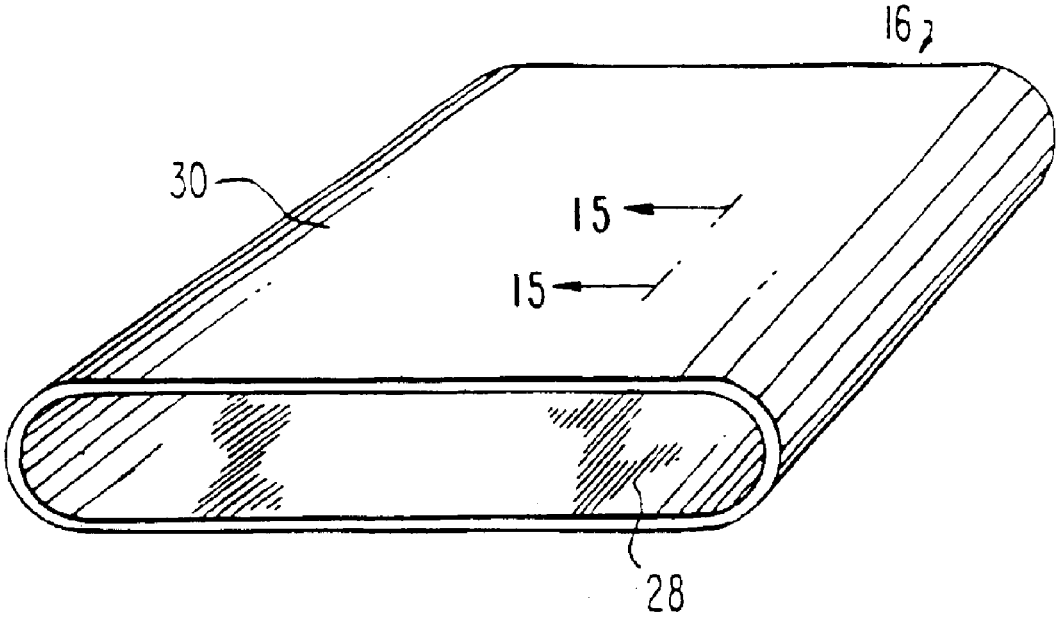
FIG. 2 is a perspective view of a belt made in accordance with the method of the present invention.

A perspective view of belt 16 is provided in FIG. 2. The belt 16 has an inner surface 28 and an outer surface 30. The outer surface 30 is finished to a smooth surface.

Figure 3:
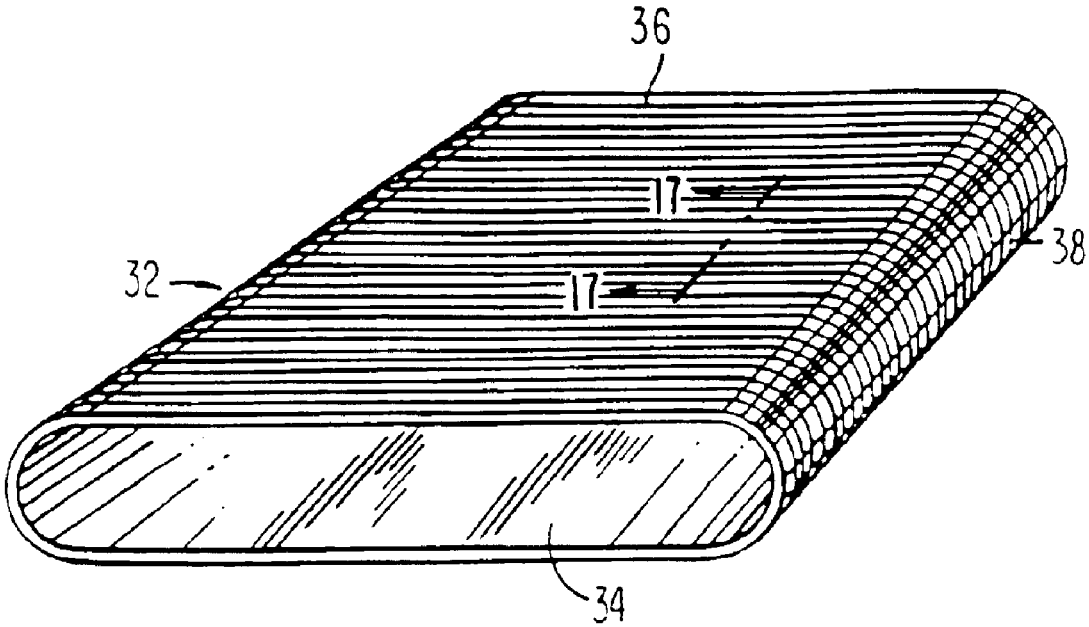
FIG. 3 is a perspective view of an alternate embodiment of the belt.

FIG. 3 is a perspective view of an alternate embodiment of the belt 32. The belt 32 has an inner surface 34 and an outer surface 36. The outer surface 36 is provided with a plurality of grooves 38, for example, in the longitudinal direction around the belt 32 for the temporary storage of water pressed from fibrous web 20 in press nip 10.

Figure 4:
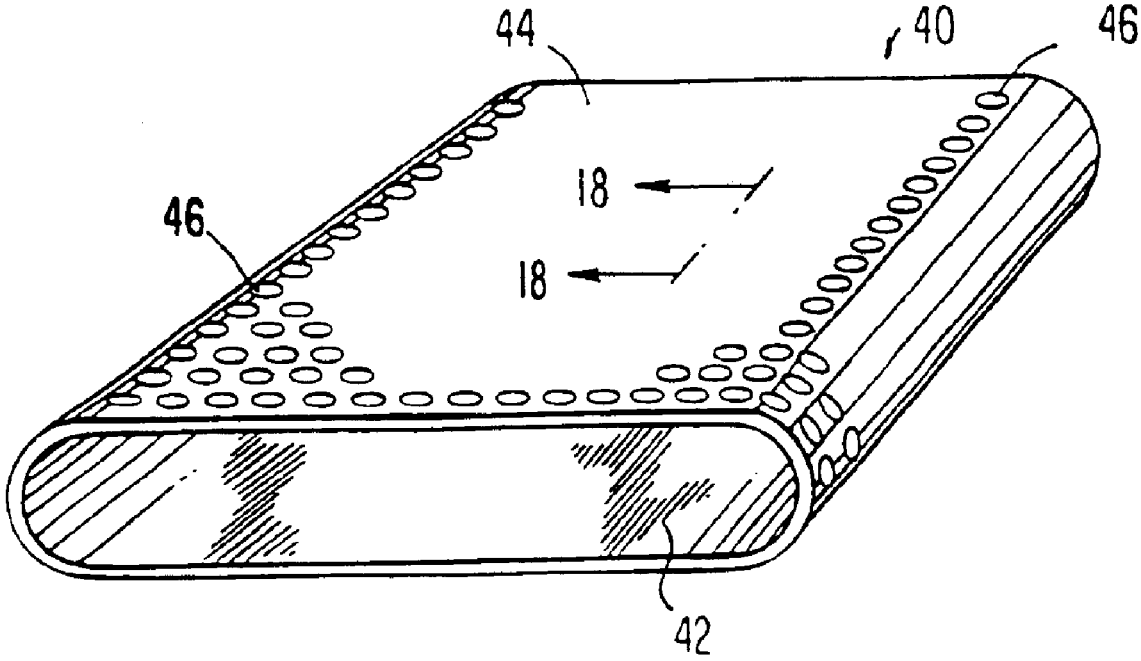
FIG. 4 is a perspective view of another embodiment of the belt.

Alternatively, the outer surface of the belt may be provided with a plurality of blind-drilled holes arranged in some desired geometric pattern for the temporary storage of water. FIG. 4 is a perspective view of such an alternate embodiment of the belt 40. The belt 40 has an inner surface 42 and an outer surface 44. The outer surface 44 is provided with a plurality of blind-drilled holes 46, so called because they do not extend completely through the belt 40. Moreover, the blind-drilled holes 46 could also be connected to one another by grooves.

The belt of the present invention includes a base fabric having machine-direction (MD) and cross-machine-direction (CD) structural elements and having a much higher open area than that characterizing the base fabrics of the prior art. Because the base fabric has such a high open area, it cannot be produced using conventional techniques alone, which tend to leave a high-open-area fabric sleazy, dimensionally unstable, and readily distorted. In the present invention, the base fabric has an open structure in which the MD and CD structural elements are joined to one another at their crossing points by mechanical, chemical or thermal means.

Figure 5:
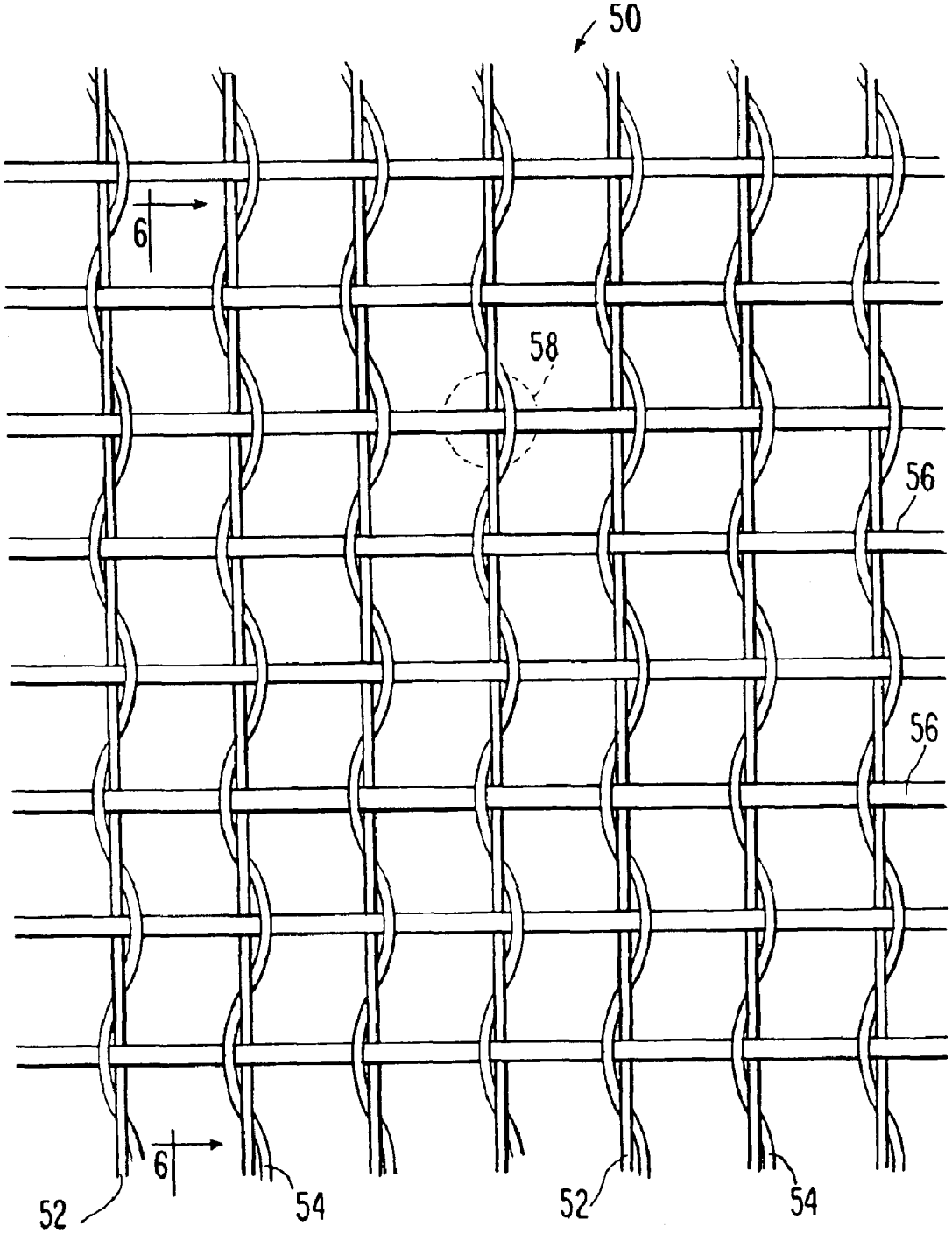
FIG. 5 is a plan view of a base fabric, woven using the Leno principle, for the belt of the present invention.

In one embodiment of the present invention, the base fabric is woven in an endless leno weave. A plan view of such a base fabric 50 is shown in FIG. 5. Base fabric 50 is woven from warp yarns 52,54 and weft yarns 56. Warp yarns 52,54 twist one around the other between picks of weft yarn 56. Warp yarns 52 remain on one side of weft yarns 56, and are referred to as the ground threads. Warp yarns 54 wrap over the other side of weft yarns 56 at each crossing point 58, but wrap under warp yarns 52 between crossing points 58 to mechanically lock the weft yarns 56 in position. Warp yarns 54 are referred to as doup threads. This manner of weaving gives firmness and strength to an open weave and prevents slipping and displacement of the warp and weft yarns.

In an endless leno weave, warp yarns 52,54 are the CD yarns of the endlessly woven base fabric 50, and the weft yarns 56 are the MD yarns.

Figure 6:
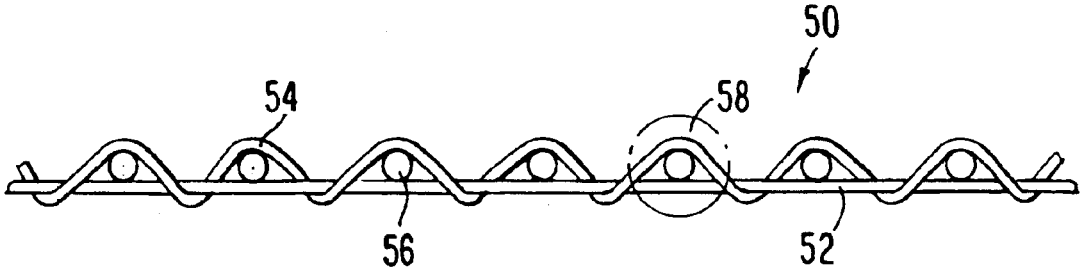
FIG. 6 is a cross-sectional view taken as indicated by line 6—6 in FIG. 5.

FIG. 6 is a cross-sectional view taken as indicated by line 6—6 in FIG. 5 and illustrating how warp yarn 54 wraps under warp yarn 52 after each crossing point 58 to mechanically lock weft yarns 56 in position.

Base fabric 50 may be woven from polyester multifilament yarns. In such a case, each pair of warp yarns 52,54 may have a combined denier of 3000, while the weft yarns 56 may themselves have a denier of 3000. In general, the selection of the yarn denier is dependent upon the final MD and CD strength required for the belt to perform in the final application. The spacing between each pair of warp yarns 52,54 may be in the range from 0.0625 inch to 0.5 inch (0.16 cm to 1.27 cm), and the spacing between each of the weft yarns 56 may also be in the range from 0.0625 inch to 0.5 inch (0.16 cm to 1.27 cm). As is well known to those of ordinary skill in the art, base fabric 50 may be woven from other types of yarns, such as monofilament and plied monofilament yarns, extruded from other synthetic polymeric resins, such as polyamide resins.

Figure 7:
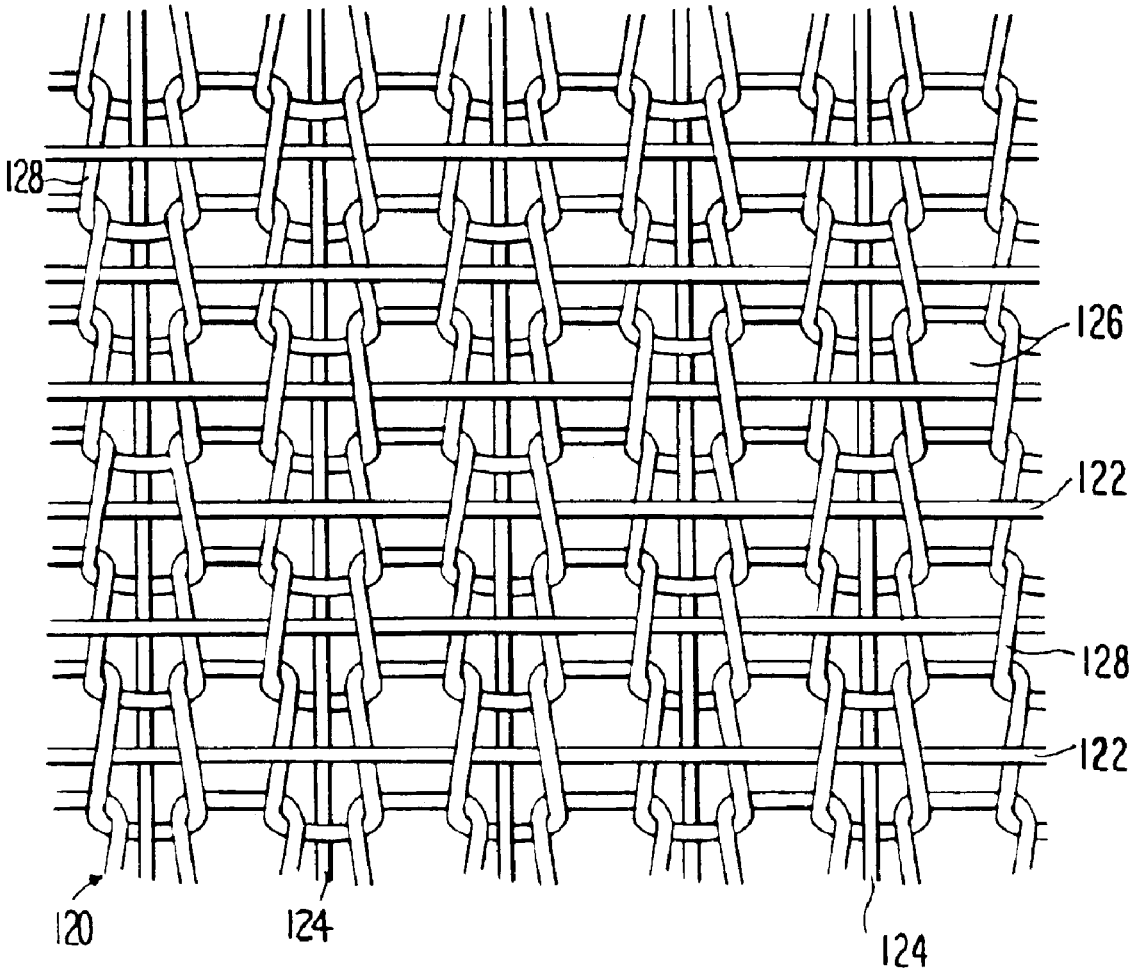
FIG. 7 is a plan view of a knitted base fabric for the present invention.

In another embodiment of the present invention, the base fabric is knitted by a circular or flat-bed knitting process in the form of an endless loop. A plan view of such a base fabric 120 is shown in FIG. 7. During the knitting process, MD yarns 122 and CD yarns 124 are laid into the knitted structure 126 formed by yarn 128, and interweave with the loops formed by yarn 128, but not with each other. The knitted structure 126 mechanically locks the MD yarns 122 and CD yarns 124 together.

Base fabric 120 may be produced from polyester multifilament yarns. In such a case, MD yarns 122 and CD yarns 124 may each have a denier of 3000, and yarns 128 forming knitted structure 126 may also have a denier of 3000. The spacing between MD yarns 122 may be in the range from 0.0625 inch to 0.5 inch (0.16 cm to 1.27 cm), and the spacing between CD yarns 124 may also be in the range from 0.0625 inch to 0.5 inch (0.16 cm to 1.27 cm). As is well known to those of ordinary skill in the art, base fabric 120 may be produced from other types of yarns, such as monofilament and plied monofilament yarns, extruded from other synthetic polymeric resins, such as polyamide resins.

Figure 8:
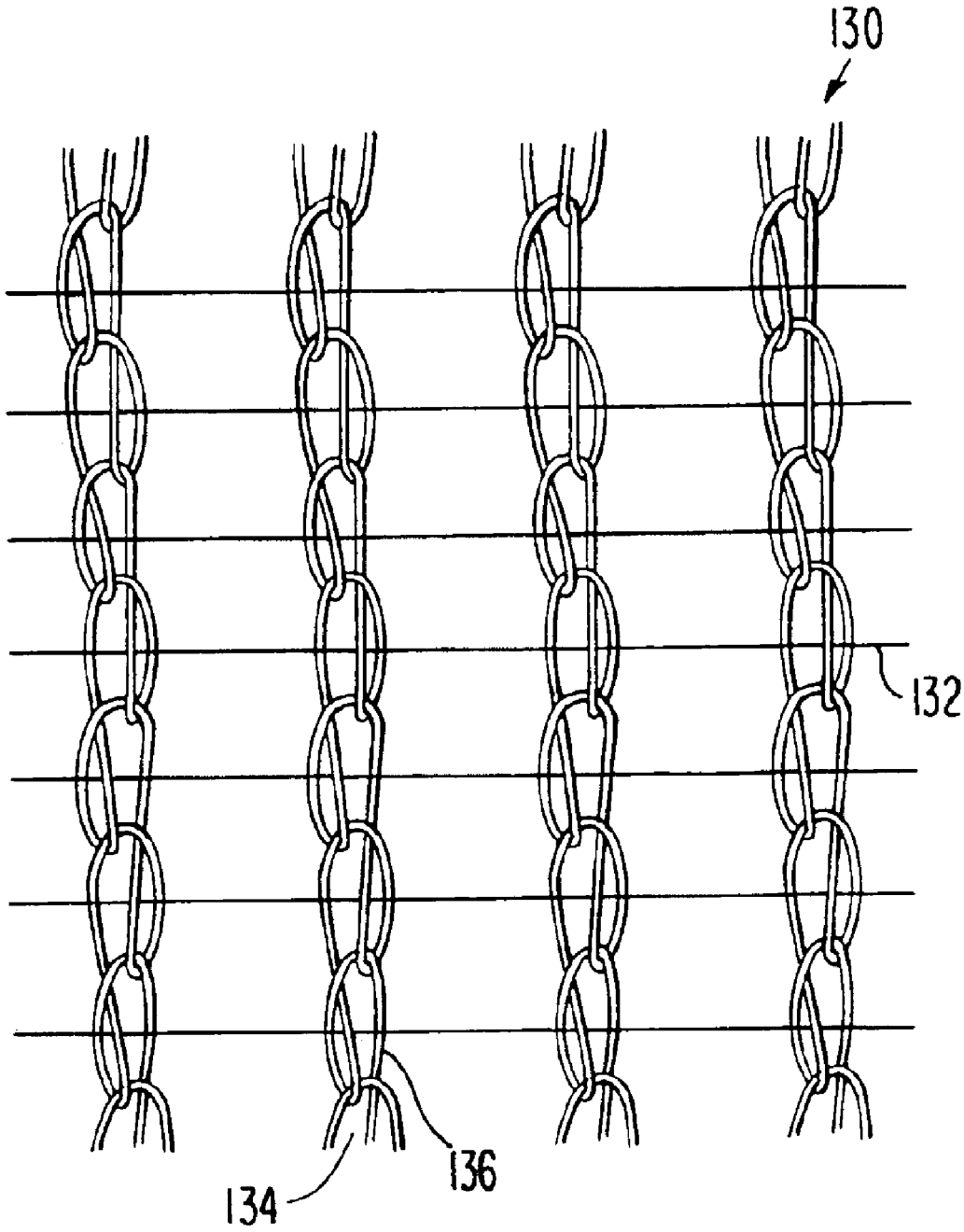
FIG. 8 is a plan view of another knitted base fabric for the present invention.

In still another embodiment of the present invention, the base fabric is knitted by a Raschel knitting process in the form of an endless loop. A plan view of such a base fabric 130 is shown in FIG. 8. During the knitting process, MD yarns 132 are laid into the Rachel-knitted CD yarns 134 formed by knitting strand 136. MD yarns 132 and CD yarns 134 are mechanically locked together by the Raschel-knitted structure of CD yarns 134.

Base fabric 130 may be produced from polyester multifilament yarns. In such a case, MD yarns 132 and strands 136 may each have a denier of 3000. The spacing between MD yarns 132 may be in the range from 0.0625 inch to 0.5 inch (0.16 cm to 1.27 cm), and the spacing between CD yarns 134 may also be in the range from 0.0625 inch to 0.5 inch (0.16 cm to 1.27 cm). As is well known to those of ordinary skill in the art, base fabric 130 may be produced from other types of yarns, such as monofilament and plied monofilament yarns, extruded from other synthetic polymeric resins, such as polyamide resins.

Figure 9:
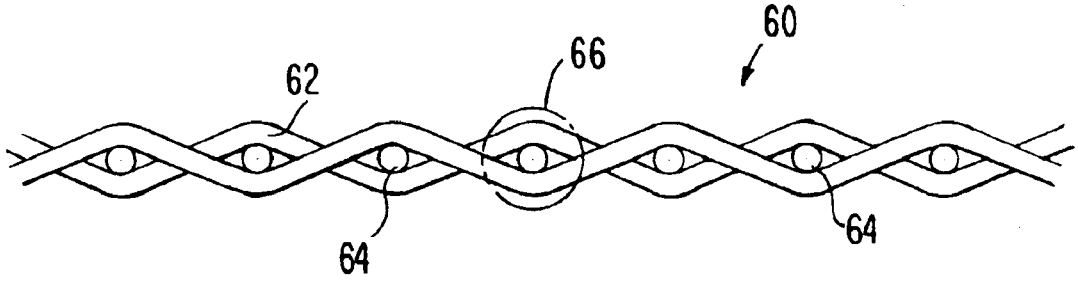
FIG. 9 is a cross-sectional view of a base fabric, woven in a plain weave, for the present invention.

In an alternate embodiment of the present invention, the base fabric is woven in a plain weave. FIG. 9 is a cross-sectional view of such a base fabric 60, which may either be flat-woven, and subsequently seamed into endless form, or woven endless. In the former case, warp yarns 62 are in the machine direction of the base fabric 60, and weft yarns 64 are in the cross-machine direction. In the latter situation, warp yarns 62 are in the cross-machine direction, and weft yarns 64 are in the machine direction.

Again, base fabric 60 may be woven from polyester multifilament yarns. Warp yarns 62 and weft yarns 64 may each be polyester multifilament yarns of about 3000 denier coated with a thermoplastic resin material. The spacing between adjacent warp threads 62 and between adjacent weft threads 64 may again be in the range from 0.0625 inch to 0.5 inch (0.16 cm to 1.27 cm). Base fabric 60 may also be woven from yarns of other varieties, such as monofilament and plied monofilament yarns, extruded from other synthetic polymeric resins, such as polyamide resins, as is well-known to those of ordinary skill in the art. These other varieties of yarns, too, may be coated with a thermoplastic resin material.

After base fabric 60 is woven, it is exposed to a heat treatment sufficient to soften the thermoplastic resin material coating the warp yarns 62 and the weft yarns 64, so that they bond to one another at the crossing points 66 to stabilize the weave structure. Alternatively, instead of using yarns coated with a thermoplastic resin material, the base fabric 60 may be woven from uncoated polyester multifilament yarns of about 3000 denier, and, after weaving, coated with a chemical material which bonds the warp yarns 62 to the weft yarns 64 at crossing points 66 to stabilize the weave structure.

For example, base fabric 60 may be woven from warp yarns 62 and weft yarns 64, which are both plied multifilament yarns comprising bicomponent sheath/core filaments, wherein the sheath and core have two different melting points. Yarns comprising filaments of this type are available from Kanebo under the trademark BELL COUPLE®. The filaments have a polyester core with a melting point in a range from 100° C. to 500° C., and a polyester copolymer sheath with a melting point in a range from 50° C. to 450° C. Filaments having denier in a range from 0.5 to 40 are available. In practice, a 10- or 12-ply version of a 250-denier multifilament yarn including 16 filaments twisted together at a rate of 100 turns/meter (0.39 turns/inch) may be used. The heat treatment would be carried out at a temperature higher than the melting point of the sheath, but below the melting point of the core to thermally bond the warp yarns 62 to the weft yarns 64 at crossing points 66.

Warp yarns 62 and weft yarns 64 may alternatively be polyester multifilament yarns having a thermoplastic polyurethane coating. Yarns of this type are commonly used as tire cords, for which the polyurethane acts as a tie coat to bond the yarn to the tire material. The heat treatment would then be carried out at a temperature between the melting points of the polyester and the thermoplastic polyurethane, the latter, being the coating, having the lower melting point.

Finally, as noted above, base fabric 60 may be woven from warp yarns 62 and weft yarns 64 which are both uncoated polyester multifilament yarns. After weaving, the base fabric 60 may then be chemically treated with an acrylic, epoxy or other polymeric resin coating material to chemically bond the warp yarns 62 to the weft yarns 64 at crossing points 66.

Figure 10:
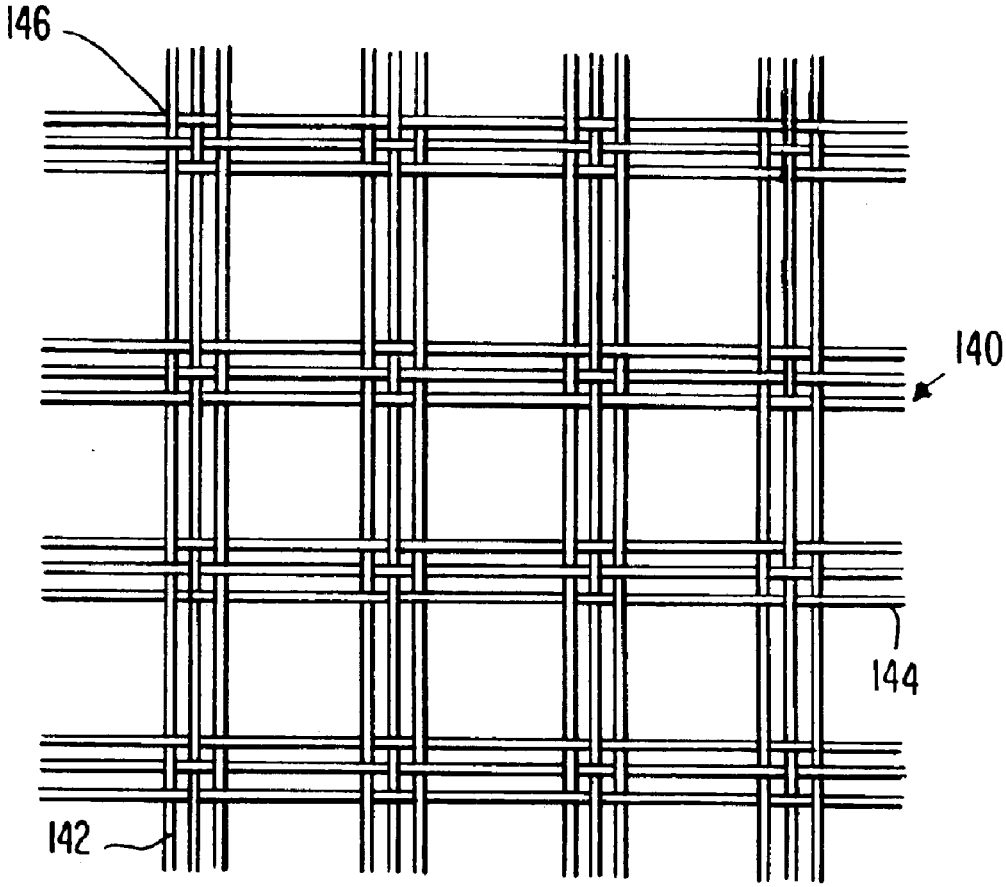
FIG. 10 is a plan view of another woven base fabric for the present invention.

In still another embodiment of the present invention, the base fabric is woven in an open weave wherein three yarns weave side-by-side in each direction of the fabric, each such triple being separated from the next in each direction to provide the fabric with a high open area. FIG. 10 is a plan view of such a base fabric 140, which may either be flat-woven, and subsequently seamed into endless form, or woven endless. In the former case, warp yarns 142 are in the machine direction of the base fabric 140, and weft yarns 144 are in the cross-machine direction. In the latter situation, warp yarns 142 are in the cross-machine direction, and weft yarns 144 are in the machine direction. In either case, three warp yarns 142 and three weft yarns 144 weave side-by-side one another, and each said triple of yarns in each direction is separated from the next to provide the fabric with a high open area.

Base fabric 140 may be woven from polyester multifilament yarns. Warp yarns 142 and weft yarns 144 may each be polyester multifilament yarns of about 1000 denier coated with a thermoplastic resin material. The spacing between each triple of warp yarns 142 and weft yarns 144 may again be in the range from 0.0625 inch to 0.5 inch (0.16 cm to 1.27 cm). Base fabric 140 may also be woven from yarns of other varieties, such as monofilament and plied monofilament yarns, extruded from other synthetic polymeric resins, such as polyamide resins, as is well-known to those of ordinary skill in the art. These other varieties of yarns, too, may be coated with a thermoplastic resin material.

After the base fabric 140 is woven, it is exposed to a heat treatment sufficient to soften the thermoplastic resin material coating the warp yarns 142 and the weft yarns 144, so that they bond to one another at the crossing points 146 to stabilize the weave structure. Alternatively, the other methods for stabilizing the weave structure of base fabric 60, discussed above, may be employed to stabilize base fabric 140.

Figure 11:
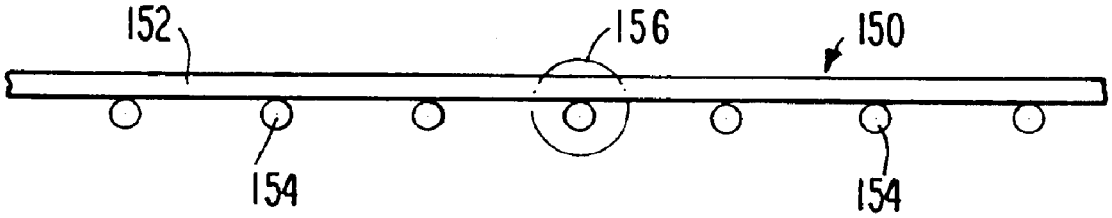
FIG. 11 is a cross-sectional view of a non-woven base fabric for the present invention.

In another embodiment of the present invention, the base fabric is a non-woven fabric. FIG. 11 is a cross-sectional view of such a base fabric 150, which includes MD yarns 152 and CD yarns 154, which are bonded to one another at their crossing points 156. Base fabric 150 is in endless-loop form. MD yarns 152 spiral around the endless-loop form, which CD yarns 154 are disposed thereacross and are bonded to MD yarns 152 at crossing points 156.

Base fabric 150 may be assembled from polyester multifilament yarns. MD yarns 152 and CD yarns 154 may each be polyester multifilament yarns of about 3000 denier coated with a thermoplastic resin material. The spacing between MD yarns 152 and between CD yarns 154 may again be in the range from 0.0625 inch to 0.5 inch (0.16 cm to 1.27 cm). Base fabric 150 may also be assembled from yarns of other varieties, such as monofilament and plied monofilament yarns, extruded from other synthetic polymeric resins, such as polyamide resins, as is well-known to those of ordinary skill in the art. These other varieties of yarns, too, may be coated with a thermoplastic resin material.

As base fabric 150 is being assembled, it is exposed to a heat treatment sufficient to soften the thermoplastic resin material coating the MD yarns 152 and CD yarns 154 to bond them together at their crossing points 156. Alternatively, the other methods for stabilizing the weave structure of base fabric 60, discussed above, may be employed to bond MD yarns 152 to CD yarns 154 at their crossing points 156.

Figure 12:
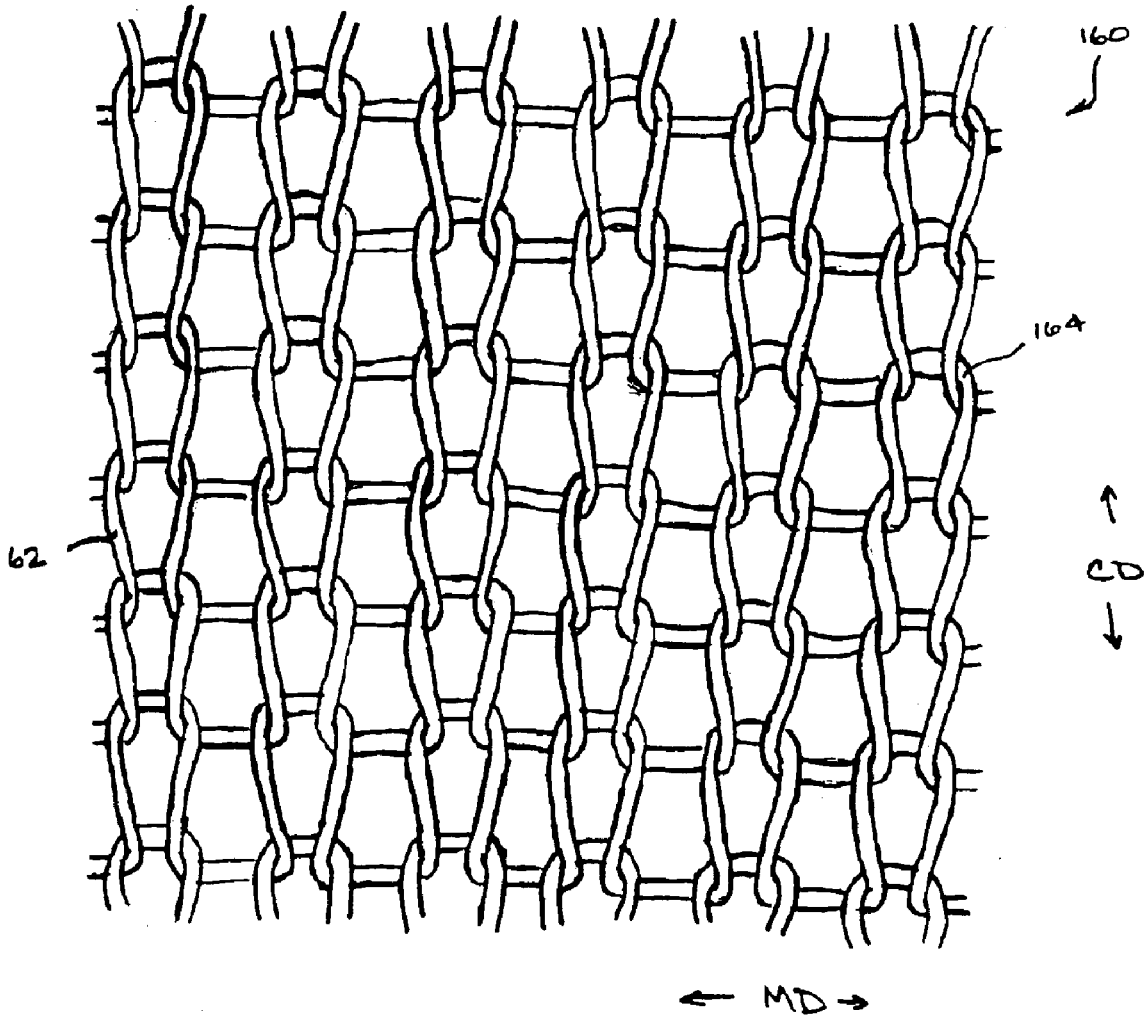
FIG. 12 is a plan view of a knitted precursor for a base fabric for the present invention.

In yet another embodiment of the present invention, the base fabric is a knitted fabric that is bonded after having been stretched as far as possible in its machine and cross-machine directions. FIG. 12 is a plan view of a precursor 160 for a knitted base fabric prior to being stretched and bonded.

Precursor 160 is knitted by a circular or flat-bed knitting process in the form of an endless loop. The machine and cross-machine directions, MD and CD, respectively, are as indicated in the figure.

Precursor 160 may be knitted from a polyester multifilament yarn 162. The yarn 162 may have a denier of 3000 and a coating of a thermoplastic resin material. As is well-known to those of ordinary skill in the art, precursor 160 may be produced from other types of yarns, such as monofilament and plied monofilament yarns, extruded from other synthetic polymeric resins, such as polyamide resins. These other varieties of yarns, too, may be coated with a thermoplastic resin material.

Figure 13:
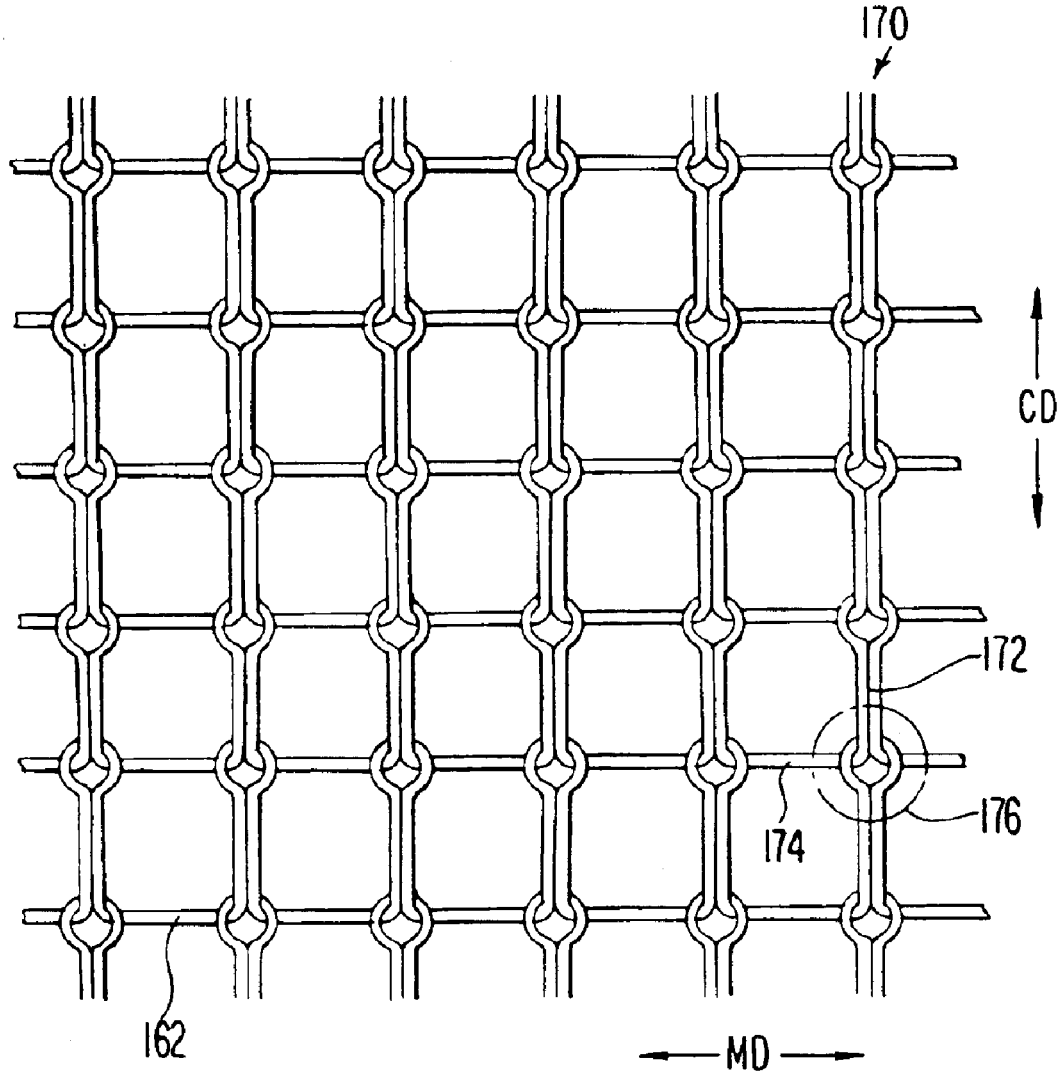
FIG. 13 is a plan view of a stretched and bonded knitted base fabric made from the precursor shown in FIG. 12.

Once the precursor 160 has been completely knitted, it is stretched as far as possible in both the machine and cross-machine directions. When this is done, loops 164 completely close, and the precursor 160 takes the form of base fabric 170, shown in plan view in FIG. 13. While held in such a configuration, base fabric 170 is exposed to a heat treatment sufficient to soften the thermoplastic resin material coating the yarn 162, so that the sections 172 oriented in the cross-machine direction bond to one another, and the sections 174 oriented in the machine direction bond to the sections 172 oriented in the cross-machine direction at crossing points 176, thereby stabilizing the structure of base fabric 170. Alternatively, the other methods for stabilizing the weave structure of base fabric 60, discussed above, may be employed to stabilize base fabric 170.

Sections 172, oriented in the cross-machine direction, and sections 174, oriented in the machine direction, are separated from one another by amounts in the range from 0.0625 inch to 0.5 inch (0.16 cm to 1.27 cm).

In any event, the exact materials and sizes of the yarns in the structure of any of the base fabrics described above may be varied to meet the mechanical requirements of the application for which the belt of the invention is intended. In addition, the yarns of the base fabrics may be coated with a polymeric resin having a chemical affinity for that to be used to impregnate the base fabrics to act as a tie coat between the impregnating resin and the base fabrics and to which the impregnating resin will chemically bond.

Figure 14:
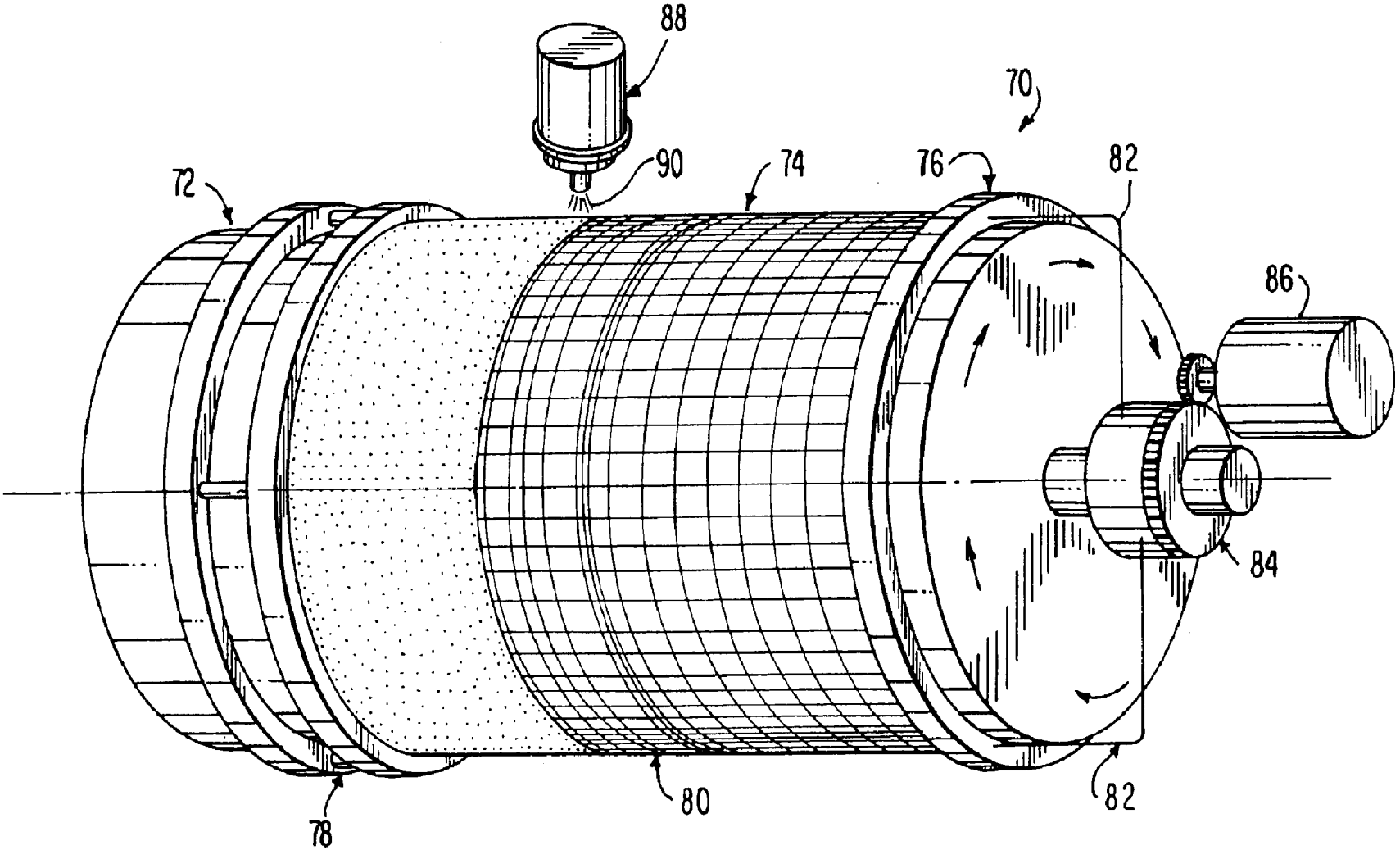
FIG. 14 is a perspective view of the apparatus used to manufacture the belts of the present invention.

FIG. 14 is a perspective view of the apparatus used to manufacture the belts of the present invention. The apparatus 70 comprises a cylindrical process roll or mandrel 72 having a smooth and polished surface. Preferably, the surface of mandrel 72 is coated with a material, such as polyethylene, polytetrafluoroethylene (PTFE) or silicone, which will readily release a polymeric resin material cured thereon.

A base fabric 74, of one of the constructions set forth above, is disposed in sleeve-like fashion upon the mandrel 72. The diameter of the endless loop formed by the base fabric 74 is equal to the diameter of the cylindrical mandrel 72 plus twice the thickness of the layer of polymeric resin required on the inside of the belt being produced, that thickness being measured between the base fabric 74 and the inside surface of the belt being manufactured.

A fixed clamping ring 76 fixes the base fabric 74 at one end of the mandrel 72. A movable clamping tension ring 78 is disposed at the other end of the mandrel 72, and places the base fabric 74 under tension longitudinally with respect to the mandrel 72, that is, in the cross-machine-direction of the base fabric 74. Both the fixed clamping ring 76 and the movable clamping tension ring 78 have clamping surfaces of a diameter equal to that of the base fabric 74.

A spacer ring 80, having a thickness equal to that desired for the layer of polymeric resin on the inside of the belt being manufactured, is disposed about the mandrel 72 beneath the base fabric 74. The spacer ring 80 is axially translated along the mandrel 72 by cables 82, which are wound onto take-up drum 84 by motor 86.

During the coating of the base fabric 74, the mandrel 72 is disposed so that its axis is oriented in a horizontal direction, and is rotated about that axis by another motor or device not shown in FIG. 14. A dispenser 88 of polymeric resin is disposed about the horizontally oriented mandrel 72, and applies polymeric resin onto the base fabric 74 substantially at the topmost point of the rotating mandrel 72. The base fabric 74, as described above, has a sufficiently high open area to allow the polymeric resin to flow unimpeded therethrough filling the space between the base weave and the mandrel.

The polymeric resin impregnates the base fabric 74, and renders the belt being manufactured impervious to oil and water. The polymeric resin may be polyurethane, and preferably is a 100% solids composition thereof. The use of a 100% solids resin system, which by definition lacks a solvent material, enables one to avoid the formation of bubbles in the polymeric resin during the curing process through which it proceeds following its application onto the base fabric 74.

The mandrel 72 is disposed with its longitudinal axis oriented in a horizontal direction, and rotated thereabout. A stream 90 of polymeric resin is applied to the outside of the base fabric 74 by starting at one end of the mandrel 72, for example, at movable clamping tension ring 78, and by proceeding longitudinally along the mandrel 72 as it rotates. The dispenser 88 is translated longitudinally above the mandrel 72 at a preselected rate to apply the polymeric resin to the base fabric 74 in the form of a spiral stream. To support the base fabric 74, the spacer ring 80 also proceeds longitudinally along the mandrel 72 just ahead of the application edge of the resin stream 90.

In order for the polymeric resin to penetrate the base fabric 74 to form a resin layer on the inside of the base fabric 74 without entrapping air bubbles therewithin, the openness of the base fabric 74 and the viscosity of the polymeric resin at the point of application are important factors. That is to say, the openness of the base fabric 74 must be sufficiently high, and the viscosity of the resin sufficiently low, to enable the polymeric resin to penetrate readily through the base fabric 74 without entrapping air bubbles. Further, the polymeric resin must be able to cross-link to the "green state", where it has cured to a point where it will no longer flow as a liquid, in a time less than that needed for the mandrel 72 to make approximately one third of a revolution. In this way, the polymeric resin will cross-link to the "green state" before the rotation of the mandrel 72 brings it to a point where it would otherwise be able to flow or drip from the mandrel 72.

The flow rate of the stream 90 of polymeric resin can be controlled merely to penetrate the base fabric 74 and to provide a layer on the inside thereof, or to provide a layer on the inside of the base fabric 74, to fill the voids in the base fabric 74, and, possibly, to provide a layer of polymeric resin on the outside of the base fabric 74.

Further, in an alternate embodiment of the present invention, two streams of polymeric resin can be applied onto the base fabric 74 from two dispensers 88, one stream being applied over the other. In this situation, the first stream of polymeric resin may provide sufficient resin to penetrate the base fabric 74 and to form a layer on the inside thereof down to the surface of the mandrel 72. The first stream may also fill the base fabric 74, and form a thin layer on the outside thereof. The second stream of polymeric resin may then provide a layer on the outside of the base fabric 74 and coating formed by the first steam of polymeric resin. Using this approach, the first stream can be of one polymeric resin and the second stream can be of another polymeric resin. This is desirable where the coatings on each side of the belts being manufactured are required to have different hardnesses, such as, for example, is the case with an LNP belt having grooves or holes on its outer surface or with a calender belt.

Figure 15:
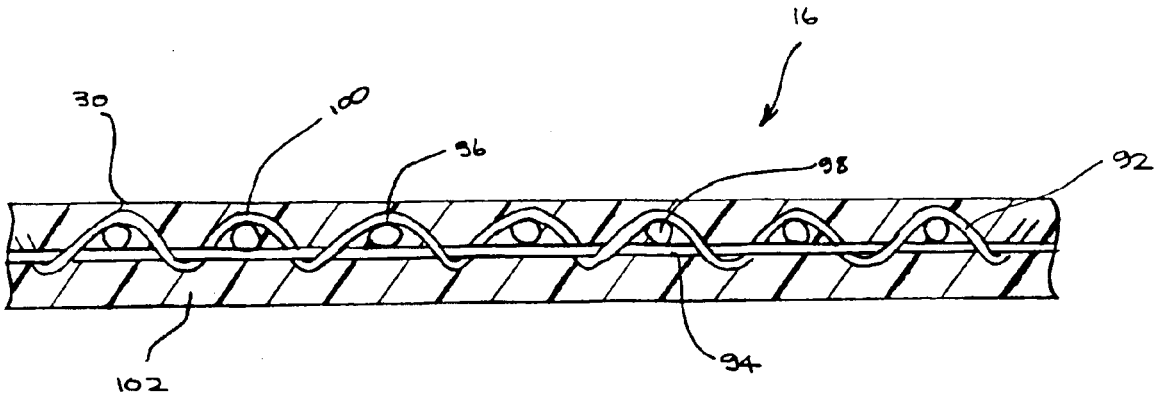
FIG. 15 is a cross-sectional view of the belt embodiment shown in FIG. 2, taken as indicated by line 15—15 in that figure.

FIG. 15 is a cross-sectional view of belt 16 taken as indicated by line 15—15 in FIG. 2. The cross section is taken in the transverse, or cross-machine, direction of belt 16, and shows that belt 16 includes a base fabric 92 of the variety shown in FIGS. 5 and 6. That is, base fabric 92 is woven in an endless leno weave from warp yarns 94,96 and weft yarns 98. Warp yarns 94,96, viewed from the side in FIG. 15, are in the cross-machine direction of the belt 16; weft yarns 98, seen in cross section, are in the machine direction of the belt 16. Crossing points 100, where warp yarns 96 weave over weft yarns 98, may be visible on the outer surface 30 of belt 16, also known as the felt side of belt 16.

The inner surface 28 of belt 16, also known as the shoe side of belt 16, is formed by a polymeric resin coating 102. The polymeric resin 102 impregnates the base fabric 92, and renders the belt 16 impervious to oil and water. Belt 16 is produced using apparatus 70 shown in FIG. 14, wherein stream 90 is controlled to provide a layer of polymeric resin 102 on the inside of the base fabric 92, to fill the voids in the base fabric 92, and to provide a layer of polymeric resin 102 covering crossing points 100 on the outside of base fabric 92. After polymeric resin 102 is cured, it may be ground and polished to provide it with a smooth surface and the belt 16 with a uniform thickness.

It may often be desirable to have a polymeric resin coating on both sides of the base fabric of a belt of this kind to ensure that the neutral axis of bending of the belt coincides with the base fabric. Where this is the case, the repeated flexing of the belt as it passes over the arcuate pressure shoe is less likely to cause the polymeric resin coating to break away and delaminate from the base fabric. Further, any polymeric resin coating on the outside of the belt (that is, the felt side) may be provided with grooves, blind-drilled holes, indentations or the like in some geometric pattern to provide a sink for the temporary storage of water pressed from fibrous web 20 in the press nip 10. Using apparatus 70, the polymeric resin coating on the outside of the belt may be the same or different from that on the inside of the belt, as discussed above.

Figure 16:
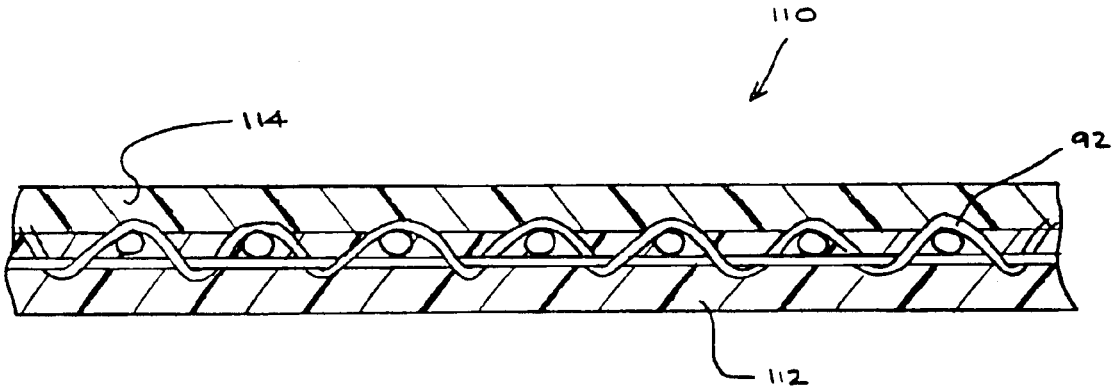
FIG. 16 is a cross-sectional view, analogous to that given in FIG. 15, for a belt having a coating on both sides.

In this regard, FIG. 16 is a cross-sectional view, analogous to that given in FIG. 15, for a belt 110 having a coating of a first polymeric resin 112 on the inside of base fabric 92, and a coating of a second polymeric resin 114 on the outside of base fabric 92. Apparatus 70 is used to manufacture belt 110. A first dispenser 88 applies first polymeric resin 112 onto base fabric 92 in an amount sufficient to penetrate base fabric 92 and to form a layer on the inside thereof down to the surface of the mandrel 72 and to fill the base fabric 92. A second dispenser 88 applies second polymeric resin 114 in an amount sufficient to cover the first polymeric resin 112 and base fabric 92 and to form a layer of second polymeric resin 114 thereover. First and second polymeric resins 112, 114 both render the belt 110 impervious to oil and water. After first and second polymeric resins 112,114 have been cured, second polymeric resin 114 may be ground and polished to provide it with a smooth surface and the belt 110 with a uniform thickness.

Figure 17:
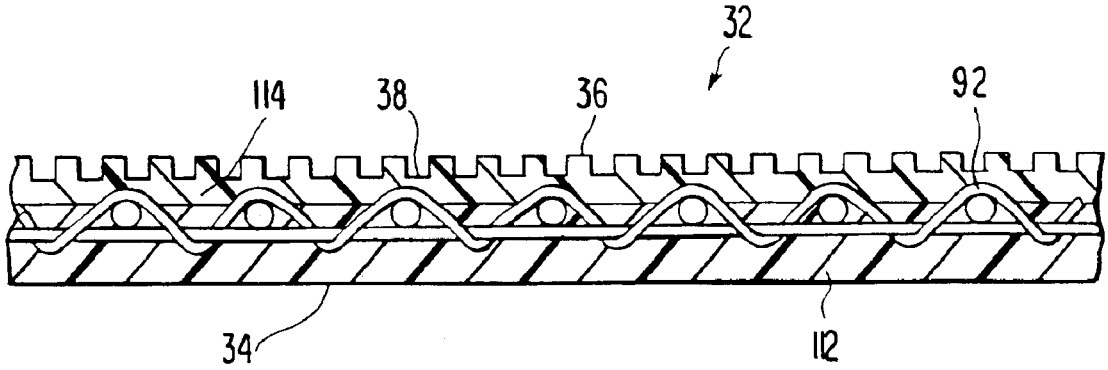
FIG. 17 is a cross-sectional view of the belt embodiment shown in FIG. 3, taken as indicated by line 17—17 in that figure.

In addition, following the grinding and polishing of second polymeric resin 114, it may be provided with grooves, blind-drilled holes, or other indentations for the temporary storage of water pressed from a paper web. For example, FIG. 17 is a cross-sectional view of belt 32 taken as indicated by line 17—17 in FIG. 3. Belt 32 is constructed in the same manner as belt 110 of FIG. 16. After first and second polymeric resins 112,114 have been cured, and second polymeric resin 114 ground and polished to provide it with a smooth surface and belt 32 with a uniform thickness, grooves 38 may be cut into the outer surface 36 of belt 32. It will be clear to those of ordinary skill in the art that the layer of second polymeric resin 114 should be of a thickness sufficient to enable grooves 38 to be cut without reaching base fabric 92.

Figure 18:
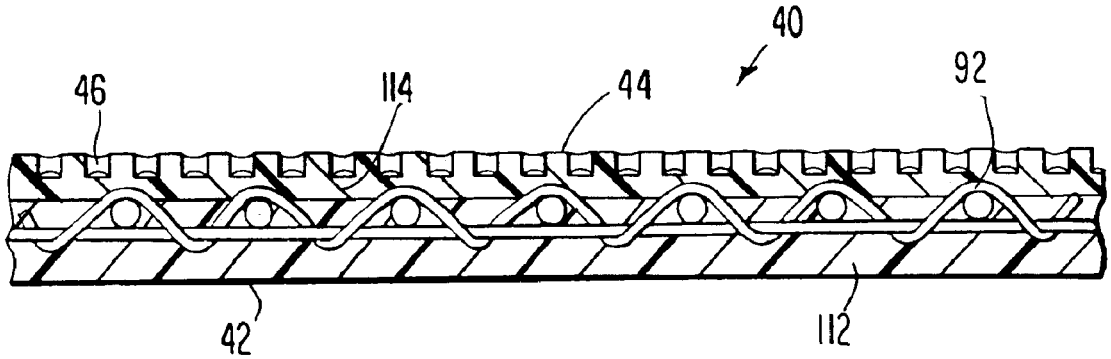
FIG. 18 is a cross-sectional view of the belt embodiment shown in FIG. 4, taken as indicated by line 18—18 in that figure.

Similarly, FIG. 18 is a cross-sectional view of belt 40 taken as indicated by line 18—18 in FIG. 4. Belt 40 is also constructed in the same manner as belt 110 of FIG. 16. After first and second polymeric resins 112,114 have been cured, and second polymeric resin 114 ground and polished to provide it with a smooth surface and belt 40 with a uniform thickness, blind-drilled holes 46 may be drilled into the outer surface 44 of belt 40. It will again be clear to those of ordinary skill in the art that the layer of second polymeric resin 112 should be of a thickness sufficient to enable blind-drilled holes 46 to be drilled without reaching base fabric 92.

It should be understood, as implied above, that belts 110,32,40, shown in cross section in FIGS. 16, 17 and 18, respectively, may be manufactured using only one polymeric resin, rather than two, that is, rather than a first and second polymeric resin 112,114. In those cases, the polymeric resin penetrates the base fabric 92 to provide a layer on the inside thereof, to fill the voids therein, and to provide a layer on the outside thereof of sufficient thickness to enable grooves 38 to be cut or blind-drilled holes 46 to be drilled without reaching base fabric 92.

The polymeric resins used in the practice of the present invention are preferably of the reactive type, either chemically cross-linked with a catalyst or cross-linked with the application of heat. Resins having a 100% solids composition, that is, lacking a solvent, are preferred, as solvents tend to generate bubbles during the curing process. Polyurethane resins having 100% solids compositions are preferred.

The apparatus 70 used in the practice of the present invention enables a smooth layer of polymeric resin to be disposed on the inside of a paper processing belt without the necessity of inverting (turning inside out) the belt at any time during the manufacturing process. However, because the polymeric resin will tend to stick to the smooth, polished cylindrical mandrel 72, it may be desirable to provide the mandrel 72 with a sleeve or coating to facilitate the removal of the belt therefrom when the polymeric resin has been cured. Polyethylene, polytetrafluoroethylene (PTFE) or silicone may be used for this purpose.

Modifications to the above would be obvious to those of ordinary skill in the art, but would not bring the invention so modified beyond the scope of the appended claims.

What is claimed is:

1. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a plain weave, and wherein at least one of said MD yarns and said CD yarns are coated with a thermoplastic resin material, said thermoplastic resin material joining said MD yarns to said CD yarns at said crossing points upon application of a heat treatment on said base fabric after weaving.

2. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a plain weave, and wherein said MD yarns and said CD yarns are joined to one another at said crossing points by a chemical material applied to said base fabric after weaving.

3. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a plain weave, and wherein said MD yarns are polyester multifilament yarns.

4. A resin-impregnated endless belt as claimed in claim 3 wherein said polyester multifilament yarns have a denier of 3000.

5. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a plain weave, and wherein said CD yarns are polyester multifilament yarns.

6. A resin-impregnated endless belt as claimed in claim 5 wherein said polyester multifilament yarns have a denier of 3000.

7. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a single-layer weave wherein a plurality of at least one of said MD yarns and said CD yarns weave side-by-side one another, and wherein at least one of said MD yarns and said CD yarns are coated with a thermoplastic resin material, said thermoplastic resin material joining said MD yarns to said CD yarns at said crossing points upon application of a heat treatment on said base fabric after weaving.

8. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a single-layer weave wherein a plurality of at least one of said MD yarns and said CD yarns weave side-by-side one another, and wherein said MD yarns and said CD yarns are joined to one another at said crossing points by a chemical material applied to said base fabric after weaving.

9. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a single-layer weave wherein a plurality of at least one of said MD yarns and said CD yarns weave side-by-side one another, and wherein said MD yarns are polyester multifilament yarns.

10. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said MD yarns are woven with said CD yarns in a single-layer weave wherein a plurality of at least one of said MD yarns and said CD yarns weave side-by-side one another, and wherein said CD yarns are polyester multifilament yarns.

11. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said CD yarns comprise first and second paired CD yarns, said first and second paired CD yarns being interwoven with said MD yarns in an endless leno weave, said MD yarns and said CD yarns thereby being mechanically locked to one another at said crossing points, and wherein at least one of said MD yarns and said CD yarns are coated with a thermoplastic resin material, said thermoplastic resin material joining said MD yarns to said CD yarns at said crossing points upon application of a heat treatment on said base fabric after weaving.

12. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said CD yarns comprise first and second paired CD yarns, said first and second paired CD yarns being interwoven with said MD yarns in an endless leno weave, said MD yarns and said CD yarns thereby being mechanically locked to one another at said crossing points, and wherein said MD yarns and said CD yarns are joined to one another at said crossing points by a chemical material applied to said base fabric after weaving.

13. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said CD yarns comprise first and second paired CD yarns, said first and second paired CD yarns being interwoven with said MD yarns in an endless leno weave, said MD yarns and said CD yarns thereby being mechanically locked to one another at said crossing points, and wherein said MD yarns are polyester multifilament yarns.

14. A resin-impregnated endless belt as claimed in claim 13 wherein said polyester multifilament yarns have a denier of 3000.

15. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a woven structure, said MD structural elements being MD yarns and said CD structural elements being CD yarns, said MD yarns being woven with said CD yarns to form said woven structure, wherein said CD yarns comprise first and second paired CD yarns, said first and second paired CD yarns being interwoven with said MD yarns in an endless leno weave, said MD yarns and said CD yarns thereby being mechanically locked to one another at said crossing points, and wherein said first and second paired CD yarns are both polyester multifilament yarns.

16. A resin-impregnated endless belt as claimed in claim 15 wherein said first and second paired CD yarns have a combined denier of 3000.

17. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a non-woven structure, said MD structural elements being MD yarns and said CD structural elements being CD yarns, said MD yarns being joined to said CD yarns at said crossing points to form said non-woven structure, wherein said MD yarns are bonded to said CD yarns at said crossing points, and wherein at least one of said MD yarns and said CD yarns are coated with a thermoplastic resin material, said thermoplastic resin material joining said MD yarns to said CD yarns at said crossing points upon application of a heat treatment.

18. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a non-woven structure, said MD structural elements being MD yarns and said CD structural elements being CD yarns, said MD yarns being joined to said CD yarns at said crossing points to form said non-woven structure, wherein said MD yarns are bonded to said CD yarns at said crossing points, and wherein said MD yarns and said CD yarns are joined to one another at said crossing points by a chemical material.

19. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a non-woven structure, said MD structural elements being MD yarns and said CD structural elements being CD yarns, said MD yarns being joined to said CD yarns at said crossing points to form said non-woven structure, and wherein said MD yarns are polyester multifilament yarns.

20. A resin-impregnated endless belt as claimed in claim 19 wherein said polyester multifilament yarns have a denier of 3000.

21. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a non-woven structure, said MD structural elements being MD yarns and said CD structural elements being CD yarns, said MD yarns being joined to said CD yarns at said crossing points to form said non-woven structure, and wherein said CD yarns are polyester multifilament yarns.

22. A resin-impregnated endless belt as claimed in claim 19 wherein said polyester multifilament yarns have a denier of 3000.

23. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is a non-woven structure, said MD structural elements being MD yarns and said CD structural elements being CD yarns, said MD yarns being joined to said CD yarns at said crossing points to form said non-woven structure, and wherein said base fabric further comprises a knitted structure, said MD yarns and said CD yarns interweaving with said knitted structure but not with each other, said knitted structure thereby mechanically joining said MD yarns to said CD yarns at said crossing points.

24. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is an endless Raschel-knitted structure, said MD structural elements being MD yarns and said CD structural elements being Raschel-knitted CD yarns, said MD yarns being laid into said Raschel-knitted CD yarns during production of said endless Raschel-knitted structure, said MD yarns thereby being mechanically interlocked with said Raschel-knitted CD yarns.

25. A resin-impregnated endless belt as claimed in claim 24 wherein at least one of said MD yarns and said CD yarns are coated with a thermoplastic resin material, said thermoplastic resin material further joining said MD yarns to said CD yarns at said crossing points upon application of a heat treatment on said base fabric after Raschel-knitting.

26. A resin-impregnated endless belt as claimed in claim 24 wherein said MD yarns and said CD yarns are further joined to one another at said crossing points by a chemical material applied to said base fabric after Raschel knitting.

27. A resin-impregnated endless belt as claimed in claim 24 wherein said MD yarns are polyester multifilament yarns.

28. A resin-impregnated endless belt as claimed in claim 27 wherein said polyester multifilament yarns have a denier of 3000.

29. A resin-impregnated endless belt for a long nip press or calender, or for other papermaking and paper-processing applications, said resin-impregnated endless belt comprising:

a base fabric, said base fabric being in the form of an endless loop with an inner surface, an outer surface, a machine direction and a cross-machine direction, said base fabric having machine-direction (MD) structural elements and cross-machine-direction (CD) structural elements wherein at least some of said MD structural elements are spaced apart from one another by a distance in the range from 0.0625 inch to 0.5 inch (0.16 cm to 1.27 cm), and wherein at least some of said CD structural elements are spaced apart from one another by a distance in the range from 0.0625 inch to 0.5 inch (0.16 cm to 1.27 cm), said MD structural elements crossing said CD structural elements at a plurality of crossing points, said MD structural elements being joined to said CD structural elements at said crossing points; and a coating of a first polymeric resin on said inner surface of said base fabric, said coating impregnating and rendering said base fabric impermeable to liquids, and forming a layer on the inner surface thereof, said coating being smooth and providing said belt with a uniform thickness, wherein said base fabric is an endless knitted structure, said endless knitted structure, being knitted from a yarn and stretched in both the machine and cross-machine directions so that sections of said yarn align with said directions and become said MD and CD structural elements, said endless knitted structure being bonded in such a stretched condition to maintain the alignment of said sections of said yarn in the machine and cross-machine directions.

30. A resin-impregnated endless belt as claimed in claim 29 wherein said yarn is coated with a thermoplastic resin material, said thermoplastic resin material bonding said endless knitted structure in said stretched condition upon application of a heat treatment on said base fabric while so stretched.

31. A resin-impregnated endless belt as claimed in claim 29 wherein said endless knitted structure is bonded in said stretched condition by a chemical material applied thereto while so stretched.

32. A resin-impregnated endless belt as claimed in claim 29 wherein said yarn is a polyester multifilament yarn.

33. A resin-impregnated endless belt as claimed in claim 32 wherein said polyester multifilament yarn has a denier of 3000.

*34. A resin-impregnated endless belt for a long nip press or calender, or for other papermaking and paper-processing applications, said resin-impregnated endless belt comprising:*

*a base, said base being in the form of an endless loop with an inner surface, an outer surface, a machine direction and a cross-machine direction, said base having machine-direction (MD) structural elements and cross-machine-direction (CD) structural elements, said MD structural elements crossing said CD structural elements at a plurality of crossing points, said MD structural elements being joined to said CD structural elements at said crossing points; and*

*a coating of a first polymeric resin on said inner surface of said base, said coating impregnating and rendering said base impermeable to liquids, and forming a layer on the inner surface thereof, said coating being smooth and providing said belt with a uniform thickness,*

*wherein said base is a non-woven structure, said MD structural elements being MD yarns and said CD structural elements being CD yarns, said MD yarns being joined to said CD yarns at said crossing points to form said non-woven structure,*

*wherein said MD yarns are bonded to said CD yarns at said crossing points, and wherein at least one of said MD yarns and said CD yarns are coated with a thermoplastic resin material, said thermoplastic resin material joining said MD yarns to said CD yarns at said crossing points upon application of a heat treatment.*

*35. A resin-impregnated endless belt for a long nip press or calender, or for other papermaking and paper-processing applications, said resin-impregnated endless belt comprising:*

*a base, said base being in the form of an endless loop with an inner surface, an outer surface, a machine direction and a cross-machine direction, said base having machine-direction (MD) structural elements and cross-machine-direction (CD) structural elements, said MD structural elements crossing said CD structural elements at a plurality of crossing points, said MD structural elements being joined to said CD structural elements at said crossing points; and*

*a coating of a first polymeric resin on said inner surface of said base, said coating impregnating and rendering said base impermeable to liquids, and forming a layer on the inner surface thereof, said coating being smooth and providing said belt with a uniform thickness,*

*wherein said base is a non-woven structure, said MD structural elements being MD yarns and said CD structural elements being CD yarns, said MD yarns being joined to said CD yarns at said crossing points to form said non-woven structure,*

*wherein said MD yarns are bonded to said CD yarns at said crossing points, and wherein said MD yarns and said CD yarns are joined to one another at said crossing points by a chemical material.*

*36. A resin-impregnated endless belt for a long nip press or calender, or for other papermaking and paper-processing applications, said resin-impregnated endless belt comprising:*

*a base, said base being in the form of an endless loop with an inner surface, an outer surface, a machine direction and a cross-machine direction, said base having machine-direction (MD) structural elements and cross-machine direction (CD) structural elements, said MD structural elements crossing said CD structural elements at a plurality of crossing points, said MD structural elements being joined to said CD structural elements at said crossing points; and*

*a coating of a first polymeric resin on said inner surface of said base, said coating impregnating and rendering said base impermeable to liquids, and forming a layer on the inner surface thereof, said coating being smooth and providing said belt with a uniform thickness,*

*wherein said base is a non-woven structure, said MD structural elements being MD yarns and said CD structural elements being CD yarns, said MD yarns being joined to said CD yarns at said crossing points to form said non-woven structure, and wherein said MD yarns are polyester multifilament yarns.*

*37. A resin-impregnated endless belt as claimed in claim 36 wherein said polyester multifilament yarns have a denier of 3000.*

*38. A resin-impregnated endless belt for a long nip press or calender, or for other papermaking and paper-processing applications, said resin-impregnated endless belt comprising:*

*a base, said base being in the form of an endless loop with an inner surface, an outer surface, a machine direction and a cross-machine direction, said base having machine-direction (MD) structural elements and cross-machine-direction (CD) structural elements, said MD structural elements crossing said CD structural elements at a plurality of crossing points, said MD structural elements being joined to said CD structural elements at said crossing points; and*

*a coating of a first polymeric resin on said inner surface of said base, said coating impregnating and rendering said base impermeable to liquids, and forming a layer on the inner surface thereof, said coating being smooth and providing said belt with a uniform thickness,*

*wherein said base is a non-woven structure, said MD structural elements being MD yarns and said CD structural elements being CD yarns, said MD yarns being joined to said CD yarns at said crossing points to form said non-woven structure, and wherein said CD yarns are polyester multifilament yarns.*

*39. A resin-impregnated endless belt as claimed in claim 38 wherein said polyester multifilament yarns have a denier of 3000.*

*40. A resin-impregnated endless belt for a long nip press or calender, or for other papermaking and paper-processing applications, said resin-impregnated endless belt comprising:*

*a base, said base being in the form of an endless loop with an inner surface, an outer surface, a machine direction and a cross-machine direction, said base having machine-direction (MD) structural elements and cross-machine-direction (CD) structural elements, said MD structural elements crossing said CD structural elements at a plurality of crossing points, said MD structural elements being joined to said CD structural elements at said crossing points; and*

*a coating of a first polymeric resin on said inner surface of said base, said coating impregnating and rendering*

*said base impermeable to liquids, and forming a layer on the inner surface thereof, said coating being smooth and providing said belt with a uniform thickness,*

*wherein said base is a non-woven structure, said MD structural elements being MD yarns and said CD structural elements being CD yarns, said MD yarns being joined to said CD yarns at said crossing points to form said non-woven structure, and wherein said base further comprises a knitted structure, said MD yarns and said CD yarns interweaving with said knitted structure but not with each other, said knitted structure thereby mechanically joining said MD yarns to said CD yarns at said crossing points.*

*41. A resin-impregnated endless belt for a long nip press or calender, or for other papermaking and paper-processing applications, said resin-impregnated endless belt comprising:*

*a base, said base being in the form of an endless loop with an inner surface, an outer surface, a machine direction and a cross-machine direction, said base having machine-direction (MD) structural elements and cross-machine-direction (CD) structural elements, said MD structural elements crossing said CD structural elements at a plurality of crossing points, said MD structural elements being joined to said CD structural elements at said crossing points; and*

*a coating of a first polymeric resin on said inner surface of said base, said coating impregnating and rendering said base impermeable to liquids, and forming a layer on the inner surface thereof, said coating being smooth and providing said belt with a uniform thickness, wherein said base is an endless knitted structure, said endless knitted structure, being knitted from a yarn and stretched in both the machine and cross-machine directions so that sections of said yarn align with said directions and become said MD and CD structural elements, said endless knitted structure being bonded in such a stretched condition to maintain the alignment of said sections of said yarn in the machine and cross-machine directions.*

* * * * *